United States Patent
Han

(10) Patent No.: US 11,391,647 B2
(45) Date of Patent: Jul. 19, 2022

(54) METHOD AND SYSTEM FOR DETERMINING CAUSE OF MISFIRE OF ENGINE

(71) Applicants: HYUNDAI MOTOR COMPANY, Seoul (KR); KIA MOTORS CORPORATION, Seoul (KR)

(72) Inventor: Jung-Suk Han, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/147,956

(22) Filed: Jan. 13, 2021

(65) Prior Publication Data

US 2022/0113222 A1 Apr. 14, 2022

(30) Foreign Application Priority Data

Oct. 14, 2020 (KR) .................. 10-2020-0132522

(51) Int. Cl.
*G01M 15/11* (2006.01)
*F02D 41/14* (2006.01)
*F02D 41/24* (2006.01)
*F02D 41/22* (2006.01)

(52) U.S. Cl.
CPC ......... *G01M 15/11* (2013.01); *F02D 41/1498* (2013.01); *F02D 41/2403* (2013.01); *F02D 2041/224* (2013.01); *F02D 2200/1015* (2013.01)

(58) Field of Classification Search
CPC G01M 15/11; F02D 41/1498; F02D 41/2403; F02D 2041/224; F02D 2200/1015
See application file for complete search history.

(56) References Cited

U.S. PATENT DOCUMENTS

| | | | | |
|---|---|---|---|---|
| 5,041,980 A * | 8/1991 | Maddock | ............... | G01M 15/11 701/101 |
| 5,088,318 A * | 2/1992 | Osawa | ................... | G01M 15/11 73/114.04 |
| 5,186,148 A * | 2/1993 | Wataya | ................... | F02D 41/22 123/479 |
| 6,801,848 B1 * | 10/2004 | Mathews | ............... | G01M 15/11 123/406.14 |
| 2013/0096805 A1 * | 4/2013 | Hoshi | ................. | F02D 41/0085 701/104 |
| 2021/0115872 A1 * | 4/2021 | Sarwar | ................. | F02D 41/064 |

FOREIGN PATENT DOCUMENTS

KR 2006-0072844 B1 6/2006

\* cited by examiner

*Primary Examiner* — George C Jin
(74) *Attorney, Agent, or Firm* — McDonnell Boehnen Hulbert & Berghoff LLP

(57) ABSTRACT

The present disclosure relates to a method and a system capable of determining the cause of misfire if the misfire occurs due to the mechanical failure of an injector. The present disclosure senses whether the misfire of an engine occurs, determines whether the mechanical failure occurs in an injector of a cylinder in which the misfire occurs, if the misfire of the engine is sensed, and determines that the misfire of the engine occurs due to the injector, and stores the failure content of the injector in a maintenance code, if it is determined that the mechanical failure occurs in the injector.

7 Claims, 11 Drawing Sheets

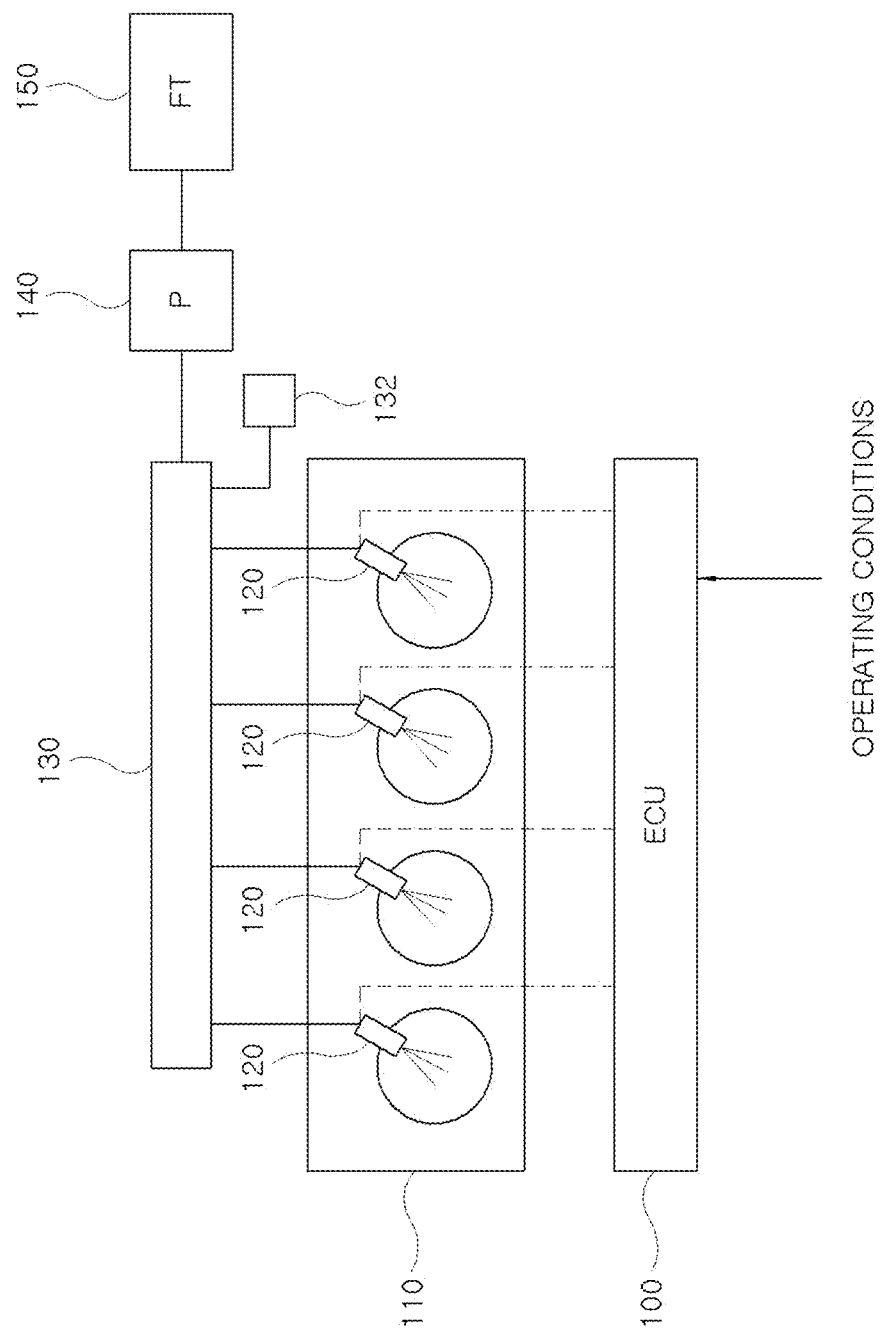

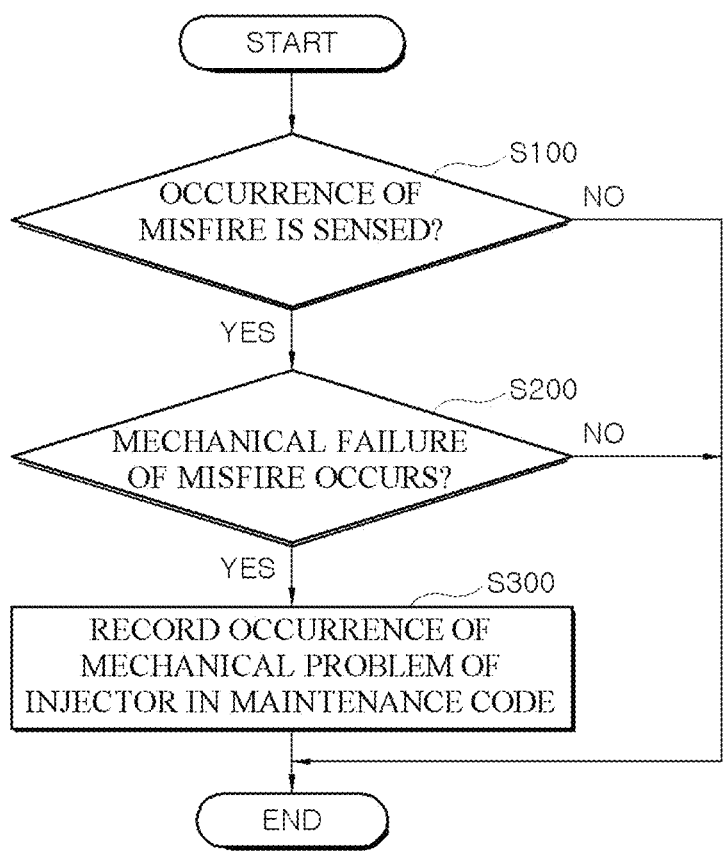

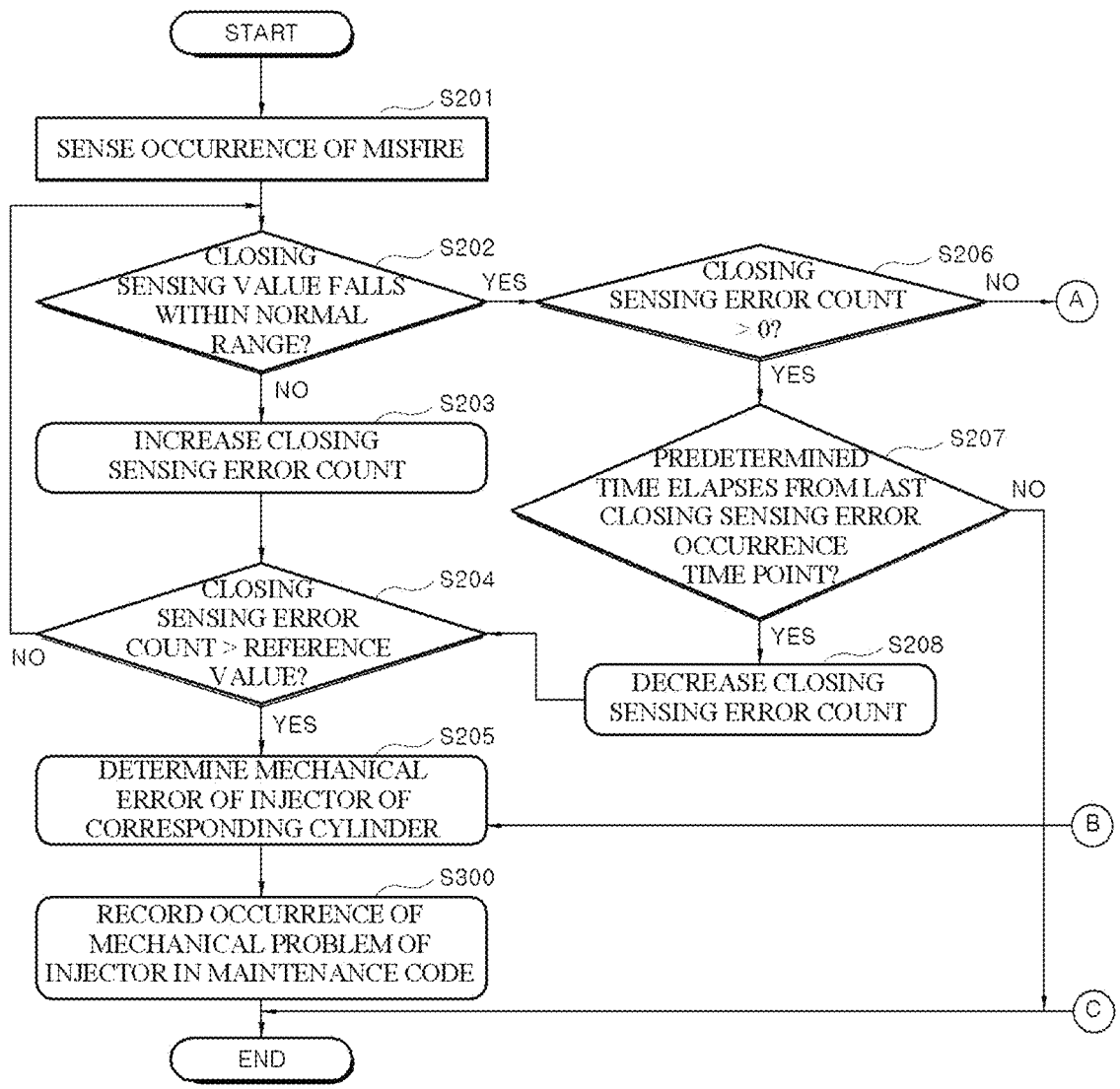

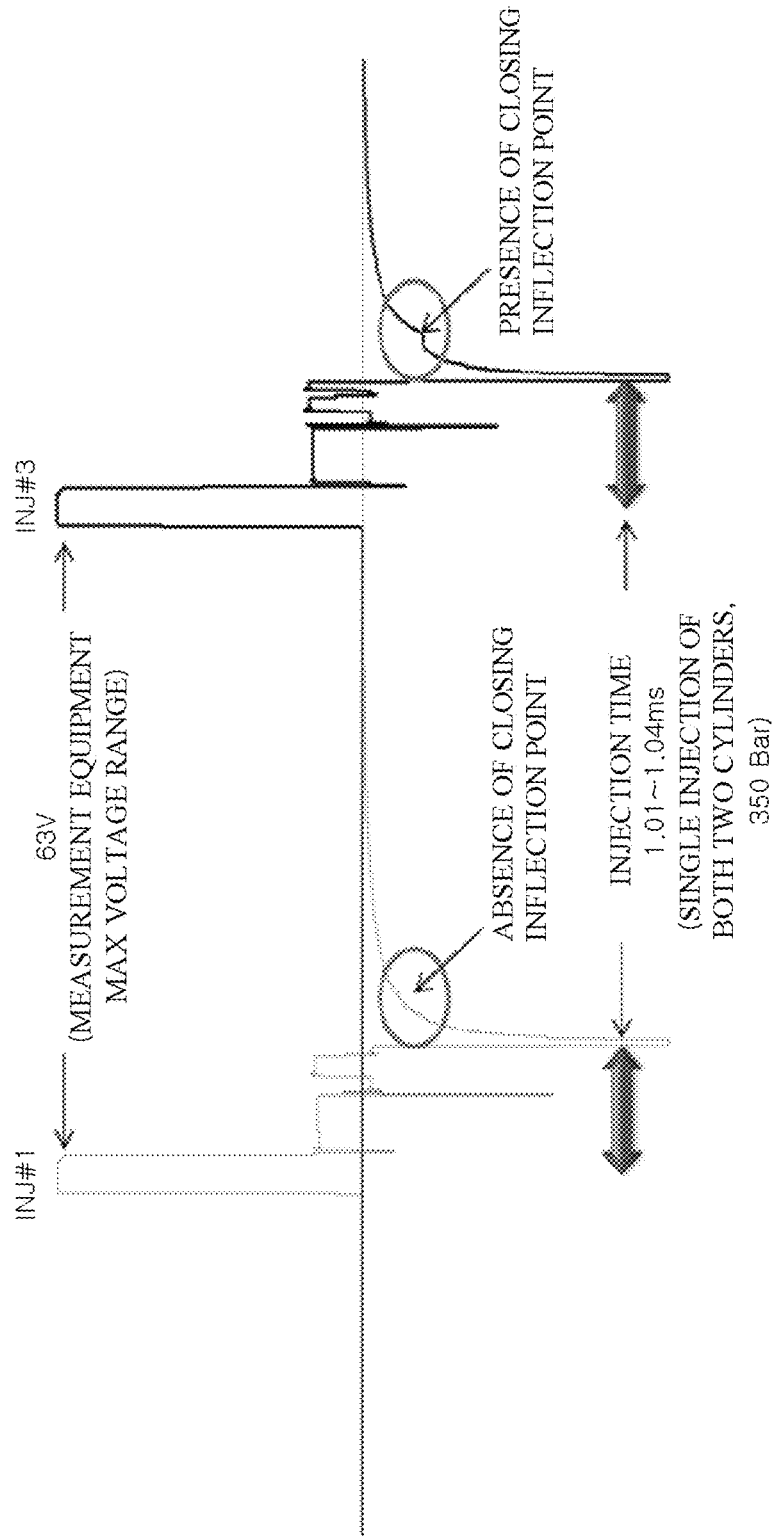

METHOD AND SYSTEM FOR DETERMINING CAUSE OF MISFIRE OF ENGINE

CROSS REFERENCE TO RELATED APPLICATIONS

This application claims priority to Korean Patent Application No. 10-2020-0132522, filed on Oct. 14, 2020, which is incorporated herein by reference in its entirety.

BACKGROUND

Field of the Disclosure

The present disclosure relates to a method and a system for determining the cause of misfire of an engine, and more specifically, to a method and a system capable of determining whether the misfire is caused by the mechanical failure of an injector provided in an engine, if the misfire occurs in the engine of a vehicle.

Description of Related Art

An internal combustion engine of a vehicle drives a vehicle combusting the fuel supplied into a cylinder using an ignition mechanism or the like, and using a rotating force generated at this time. However, if abnormal combustion occurs within the cylinder, all of the injected fuels are not combusted within a predetermined time and discharged to an exhaust system, and the abnormal combustion is called misfire. When the misfire occurs in the engine of the vehicle, the output is decreased, and fuel efficiency deteriorates, and uncombusted gas incurs the post-explosion in the exhaust system to cause damage to the entire engine system.

Therefore, as disclosed in Patent Document 1, the vehicle has a sensing system capable of sensing the occurrence of misfire. As also disclosed in Korean Patent Application Laid-Open No. 10-2004-0111594 (Jun. 28, 2006), generally, when a control unit determines that a compared result falls within a misfire condition by comparing a misfire reference value of the map data stored in the control unit every corresponding operating area with an angular velocity value of a crankshaft, the sensing system warns the driver of the misfire occurrence fact through a warning sound or a lamp.

The contents described in Description of Related Art are to help the understanding of the background of the present disclosure, and may include what is not previously known to those skilled in the art to which the present disclosure pertains.

SUMMARY

Meanwhile, misfire may often occur during traveling in a GDI vehicle or the like, and the driver has difficulty in recognizing the intermittently occurring misfire, such that the vehicle generally generates a failure code or does not warn the driver of the misfire occurrence fact. However, if the misfire is continuously and frequently sensed in the vehicle, as described above, the vehicle pops up the failure code to make the driver aware of the misfire occurrence fact, thereby inducing an auto repair shop to perform the vehicle maintenance, due to the concern of damage to an engine system or the like.

However, as described above, the misfire occurrence fact may be recognized through the engine angular velocity, but since the misfire may occur due to the inability to ignite, the fault of a fuel supply device, the engine compression decrease, or various other causes, it is difficult in an ECU to determine accurately what causes the misfire, such that in many cases, it is not possible to accurately know which component needs to be replaced. For example, if the misfire occurs clearly due to the electrical failure such as the disconnection or short-circuit of an injector or an igniter, the electrical failure code of the corresponding component together with the misfire failure code occurs, such that it is possible to indirectly determine the cause of the misfire, but if the injector is not opened by the mechanical failure inside the injector, the electrical failure code is not generated, such that an ECU has difficulty in recognizing the cause of the misfire.

Therefore, if the vehicle is put into the auto repair shop due to the occurrence of the misfire, when the electrical failure does not appear in the related component through the failure code, it is general knowledge to first replace an igniter system component. It is substantially difficult to accurately determine the cause of the misfire, and the case where the misfire occurs due to the decrease in the ignition performance caused by the failure of the igniter frequently occurs, and the replacement cost of the igniter is inexpensive compared to the replacement of other components, such that it is most preferential to replace the igniter. However, if the cause of the misfire is not caused by the igniter, the loss of the excessive cost occurs and a lot of times are required for maintenance by unnecessarily replacing the igniter.

The present disclosure is intended to solve the problem of the related art, and an object of the present disclosure is to provide a method and a system for determining the misfire, which may accurately determine the cause of the occurrence of the misfire according to the formation of the abnormal flow rate caused by the mechanical failure of an injector.

A method for determining the cause of misfire of an engine according to the present disclosure for achieving the object includes sensing whether a misfire of an engine occurs, determining whether the mechanical failure occurs in an injector of a cylinder in which the misfire occurs, if the misfire of the engine is sensed, and storing a failure content of the injector in a maintenance code by determining that the misfire of the engine occurs due to the injector, if it is determined that the mechanical failure occurs in the injector.

In some embodiments, the determining of whether the mechanical failure occurs in the injector of the cylinder in which the misfire occurs may determine whether the mechanical failure occurs in the injector by determining whether a closing sensing value of the injector falls within a normal range.

In some embodiments, if the closing sensing value of the injector does not fall within the normal range, a closing sensing error count is increased, and if the closing sensing cumulative error count exceeds a predetermined value, it is determined that the mechanical failure occurs in the injector.

In some embodiments, if the closing sensing error count is larger than 0, the closing sensing error count is decreased when a predetermined time or more elapse from the last closing sensing error occurrence time point.

In some embodiments, if it is determined that the closing sensing value of the injector falls within the normal range, it is determined whether the mechanical failure occurs in the injector by determining whether a measured value of a static flow rate falls within a normal range.

In some embodiments, if the measured value of the static flow rate does not fall within the normal range, the static flow rate error count is increased, and if the static flow rate error count exceeds a predetermined value, it is determined that the mechanical failure occurs in the injector.

In some embodiments, if the static flow rate error count is larger than 0, the static flow rate error count is decreased when a predetermined time or more elapse from the last static flow rate error occurrence time point.

In some embodiments, it is determined whether the mechanical failure occurs in the injector of the cylinder in which the misfire occurs every time the fuel is injected to each cylinder of the engine by the injector.

A system for determining the cause of misfire according to the present disclosure for achieving the object includes a misfire presence/absence determining unit for determining whether the misfire of an engine occurs, an injector normality determining unit for determining whether the mechanical failure occurs in the injector of a cylinder in which the misfire occurs, and a maintenance code storing unit for storing a state of the corresponding injector in a maintenance code, if it is determined that the mechanical failure occurs in the injector by the injector normality determining unit.

In some embodiments, the injector normality determining unit has a closing time normality presence/absence determining unit for determining whether a closing time of the injector falls within a normal range.

In some embodiments, the injector normality determining unit has a pressure drop amount normality presence/absence determining unit for determining whether the pressure drop amounts just before and just after the injection of the injector fall within a normal range.

The present disclosure may determine the presence or absence of the mechanical failure of the injector when the misfire occurs, and interlock the failure code according to the determination result with the misfire occurrence failure code, thereby accurately determining the cause of the occurrence of the misfire due to the mechanical failure of the injector. Therefore, it is possible to decrease the possibility of the incorrect maintenance, thereby significantly decreasing the maintenance time and the maintenance cost.

BRIEF DESCRIPTION OF THE FIGURES

FIG. 1 is a diagram illustrating a schematic configuration of a fuel injection system of a vehicle to which a method for determining the cause of misfire according to an exemplary embodiment of the present disclosure may be applied.

FIG. 3 is a flowchart illustrating the method for determining the cause of the misfire according to an exemplary embodiment of the present disclosure.

FIGS. 4A and 4B are a flowchart specifically illustrating determining the occurrence of the mechanical failure of an injector of the method for determining the cause of the misfire illustrated in FIG. 3.

FIG. 5 is a diagram illustrating an output voltage curve of a normal injector, and a mechanical failure occurring injector.

DETAILED DESCRIPTION

Hereinafter, a method and a system for determining the cause of misfire according to a preferred exemplary embodiment of the present disclosure will be described with reference to the accompanying drawings.

Figure 9:
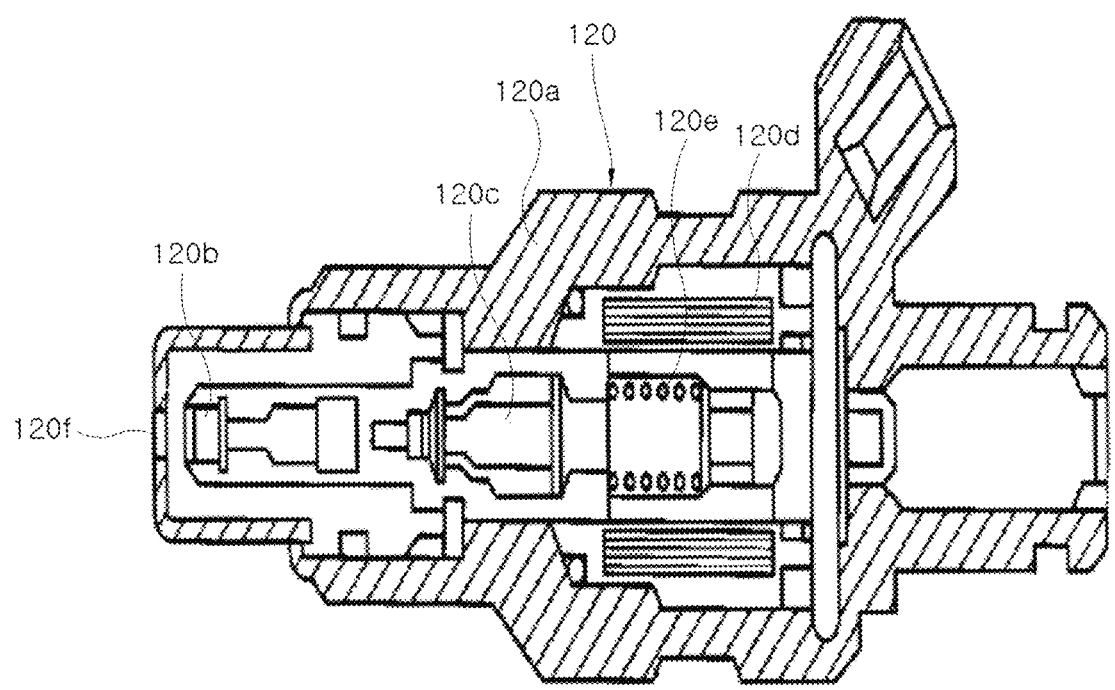
FIG. 9 is a cross-sectional diagram illustrating a configuration of the injector.

FIG. 1 is a diagram illustrating a schematic configuration of a fuel injection system of a vehicle to which a method for determining the cause of misfire according to an exemplary embodiment of the present disclosure may be applied, and FIG. 9 is a cross-sectional diagram illustrating a configuration of the injector.

Referring to FIG. 1, a control system of an injector includes a fuel tank 150, a fuel pump 140, a rail 130, a pressure sensor 132, an injector 120, an engine 110, and a control unit 100.

The fuel tank 150 is filled with the fuel used in an internal combustion engine, and the fuel pump 140 pumps the fuel stored in the fuel tank 150 to the rail. The rail 130 is disposed with the pressure sensor 132 for sensing the inner pressure, and formed with separate regulator valve (not illustrated) and a return line (not illustrated).

The fuel pumped to the common rail 130 is distributed to the injector 120, and the injector 120 is disposed to correspond to each cylinder to inject the fuel to a combustion chamber of the engine 110.

As illustrated in FIG. 9, a needle valve 120b is formed inside a housing 120a of the injector 120, and an armature 120c and a coil 120d for operating the needle valve 120b, a spring 120e, and the like are formed therein. The needle valve 120b repetitively moves back and forth by an operation of the armature 120c to block or open a nozzle 120f formed on the edge of the housing 120a. That is, when a current is applied to the coil 120d, the armature 120c is operated to pull the needle valve 120b, and when the current is cut off, the needle valve 120b is formed to return to the original location by the elasticity of the spring 120e.

The injector 120 is provided for each cylinder to receive a fuel injection signal from the control unit 100 to inject the fuel during a predetermined injection time, thereby supplying the fuel into an engine by a demand fuel amount.

The control unit 100 may set a demand injection fuel amount according to operating conditions, for example, the RPM of the engine and an acceleration pedal signal, and control an injection command time of the injector in response to the set demand injection fuel amount.

Figure 2A:
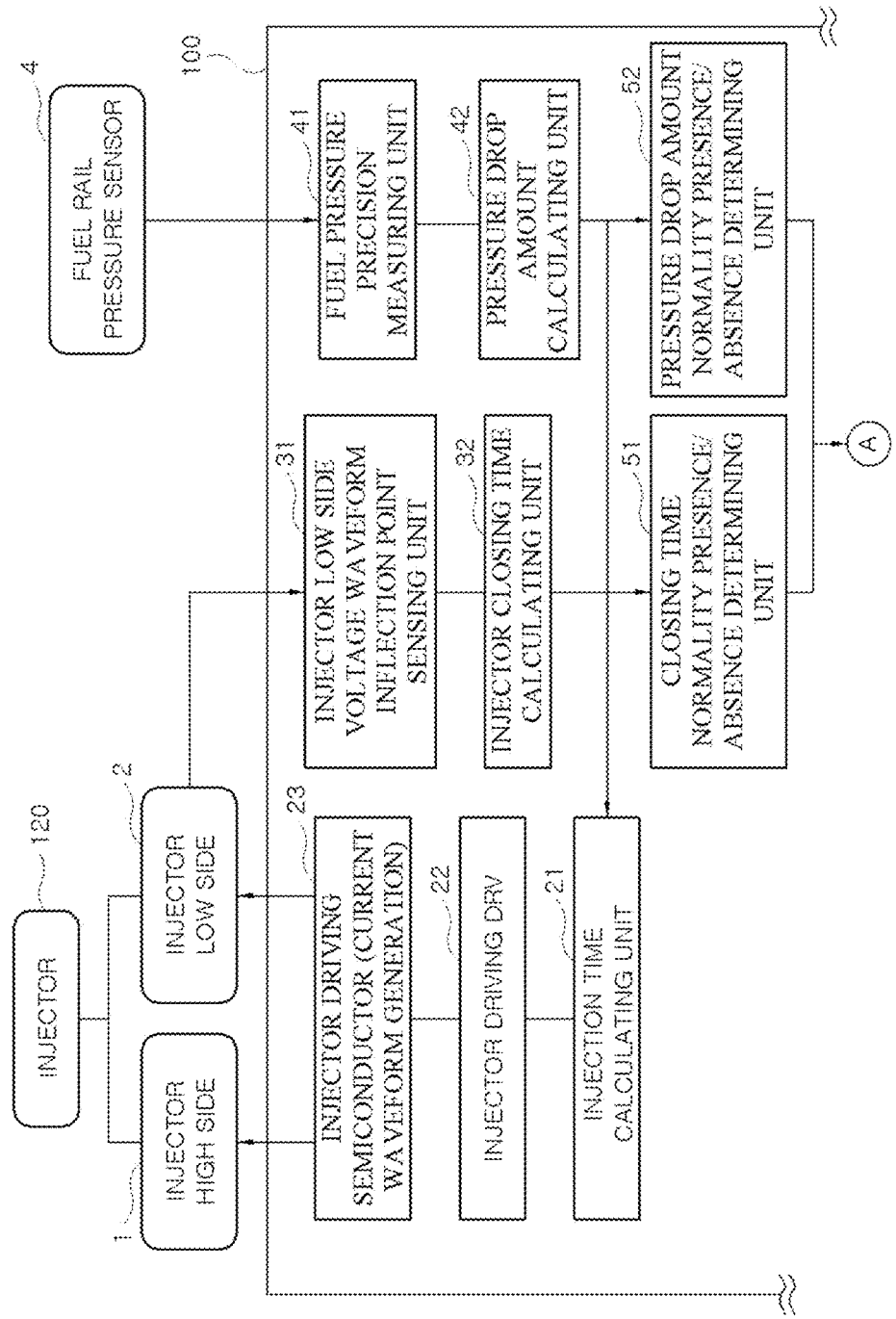
FIGS. 2A and 2B are a block diagram illustrating a configuration of a system for determining the cause of the misfire according to the exemplary embodiment of the present disclosure.
Figure 2B:
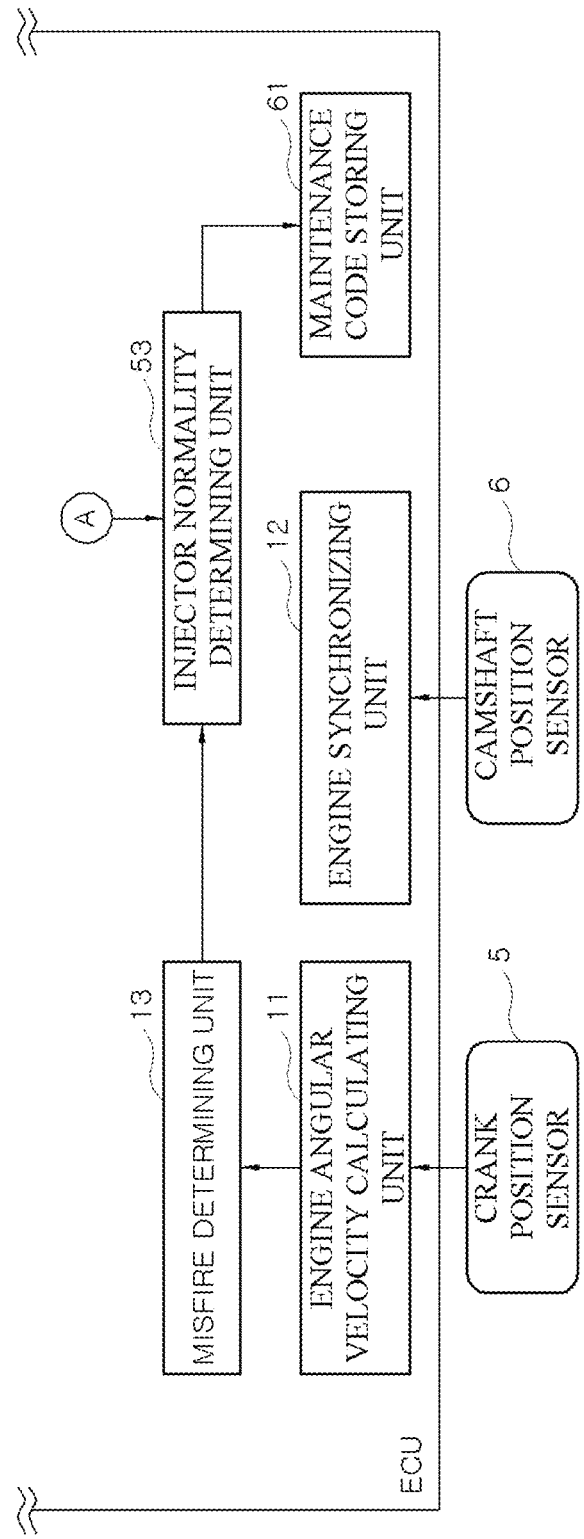

FIGS. 2A and 2B are a block diagram illustrating a configuration of the system for determining the cause of the misfire according to the exemplary embodiment of the present disclosure.

According to the content illustrated in FIGS. 2A and 2B, the system for determining the cause of the misfire according to the exemplary embodiment of the present disclosure has the injector 120 for injecting the fuel to the cylinder, and the control unit 100 for controlling the injector 120 such that the fuel is injected from the injector by a target injection fuel amount, and determining the cause of the occurrence of the misfire caused by the occurrence of the mechanical failure of the injector 120.

The control unit 100 is connected to each of a high side 1 and a low side 2 of the injector 120 for driving the injector 120.

An injector driving semiconductor 23 is connected to each of the high side 1 and the low side 2 of the injector 120, and receives a driving command signal from an injector driving driver 22 to generate a current waveform and applies the pulse generated by the current waveform to the high side 1 and the low side 2 of the injector 120 to drive the injector 120. The injector driving driver 22 applies the pulse corresponding to the injection time calculated by an injection time calculating unit 21 to the high side 1 and the low side 2 of the injector 120.

Meanwhile, when the injection by the injector 120 is terminated, only the low side is activated, such that a counter electromotive current from the injector 120 flows to the low side. Therefore, an injector low side voltage waveform inflection point sensing unit 31 of the control unit 100 receives a voltage signal of the counter electromotive current from the low side 2 of the injector 120 to generate a voltage waveform, and senses the inflection point of the voltage waveform.

Further, an injector closing time calculating unit 32 calculates a closing time of the injector 120 based on the location of the inflection point sensed by the injector low side voltage waveform inflection point sensing unit 31.

Figure 8:
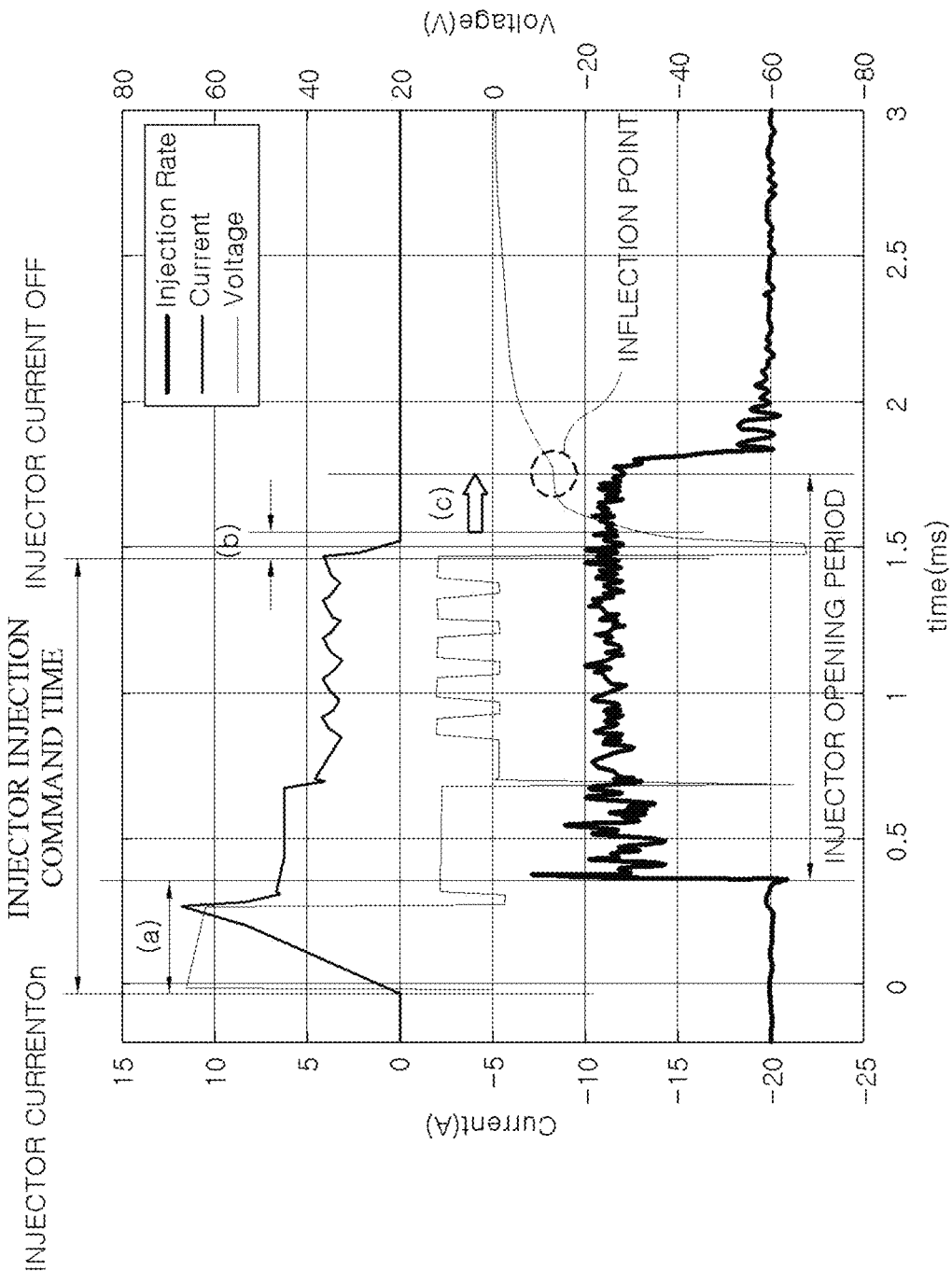
FIG. 8 is a graph illustrating the relationship between an injector opening period, which is a period during which the fuel is actually injected from the injector, a current applied to the injector, and a voltage generated by the injector.

FIG. 8 is a graph illustrating the relationship between an injector opening period, which is a period during which the fuel is actually injected from the injector, a current applied to the injector, and a voltage generated by the injector. Referring to FIG. 8, a horizontal axis refers to the time, and a vertical axis refers to the magnitudes of the current and the voltage, and the amount of fuel injected from the injector.

As illustrated in FIG. 8, the voltage generated by the injector tends to be rapidly increased and decreased at the beginning of the application of the current to the injector, and then increased again. Further, thereafter, the voltage is rapidly decreased again at the time point at which the application of the current to the injector is OFF, and after a predetermined time delay (section (b), about 0.1 ms), the voltage is rapidly increased again. As illustrated in FIG. 8, the inflection point exists on the voltage curve in the section in which the voltage is increased again (section (c)), and the time point at which the inflection point exists becomes the time point at which the fuel injection is terminated (injector closing time) because the needle of the injector is closed. Therefore, when the time point at which the inflection point exists is sensed, the injector closing time may be calculated by secondarily differentiating the voltage curve.

A fuel pressure precision measuring unit 41 precisely measures the current pressure of a rail from a pressure sensor provided in the fuel rail at high speed. A pressure drop amount calculating unit 42 calculates a difference between the pressures just before and just after the injector 120 injects the fuel to measure the injection amount of the injector at the time point at which the flow rate is stably formed. Further, the pressure drop amount calculating unit 42 may calculate a static flow rate value using the pressure drop amount.

The present disclosure has each of a closing time normality presence/absence determining unit 51 and a pressure drop amount normality presence/absence determining unit 52 for determining whether the cause of the misfire upon the occurrence of the misfire is the mechanical failure of the injector 120 to determine the current state of the injector in an injector normality determining unit 53 every time the injection is performed.

For example, when the mechanical failure occurs in the injector 120, even if the current is normally applied to the injector 120 by the injector driving driver 22 and the injector driving semiconductor 23, that is, even if the electrical failure does not occur in the injector 120, the needle of the needle valve 120b does not move upward, such that the injector 120 is not opened.

FIG. 5 illustrates output voltage curve data measured from the vehicle in which the misfire occurs in a first cylinder CYL #1. Referring to FIG. 5, it may be seen that the injection waveform of a first injector INJ #1 of the first cylinder CYL #1 in which the misfire occurs, and the injection waveform of a third injector INJ #3 of a third cylinder CYL #3 in which the misfire does not occur are different from each other. The inflection point representing the closing time after the injection is terminated appears on the waveform of the third injector INJ #3, whereas the inflection point may not be found in the first injector INJ #1. Since the inflection point representing the closing time does not exist, it may be determined that the injector is not opened in the first injector INJ #1.

As described above, if the injector 120 is not opened, it is natural that the injector 120 is not closed, such that the injector low side voltage waveform inflection point sensing unit 31 may not sense the inflection point of the voltage waveform. Therefore, the calculation result of the injector closing time calculating unit 32 based on the inflection point significantly deviates from a normal value as well.

Figure 6:
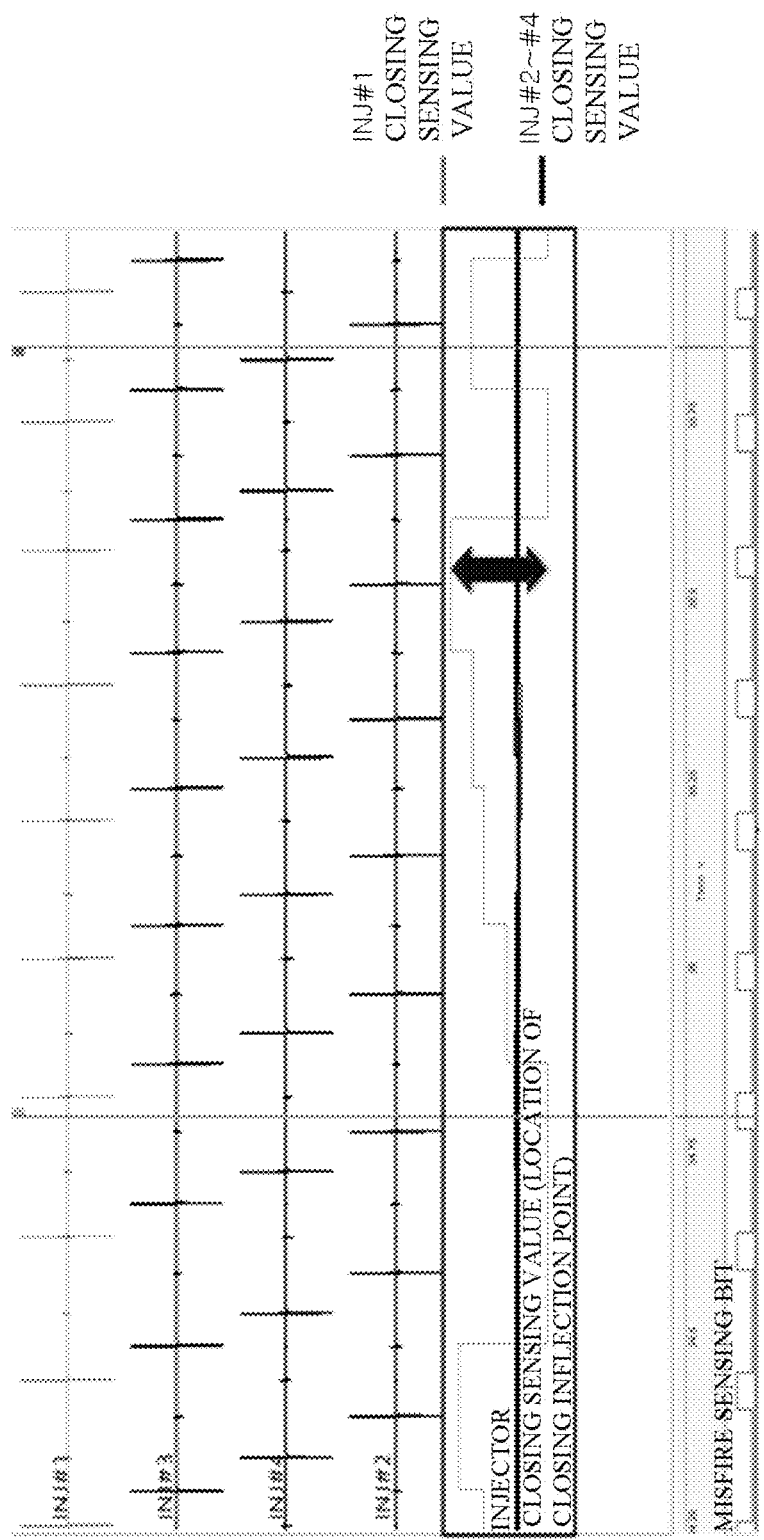
FIG. 6 is a signal diagram illustrating a difference between the closing sensing values of the normal injector and the mechanical failure occurring injector.

FIG. 6 is a diagram illustrating a closing sensing value for each cylinder when the inflection point is not generated. The closing sensing value refers to a value expressing, as the time, the location of the point indicated by the inflection point after the output command for the injector 120 is terminated, and the closing sensing value of a predetermined level is required to be calculated when the inflection point is normally generated. However, the closing sensing values in a second cylinder CYL #2 to a fourth cylinder CYL #4 in which the misfire does not occur stably maintain the predetermined level but the closing sensing value in the first cylinder CYL #1 in which the misfire occurs abnormally becomes a larger or smaller value. That is, an invalid value is continuously calculated because it is not possible to find the inflection point.

Therefore, the injector normality determining unit 53 compares the closing time calculated by the closing time calculating unit 32 with a predetermined normal value every time the injection is performed by the injector 120, and if the calculated closing time deviates from a normal range, it is determined that the mechanical failure occurs in the injector 120.

Meanwhile, likewise, when the mechanical failure occurs in the injector 120, the injector 120 is not opened, such that the fuel is not normally injected from the injector 120.

Figure 7:
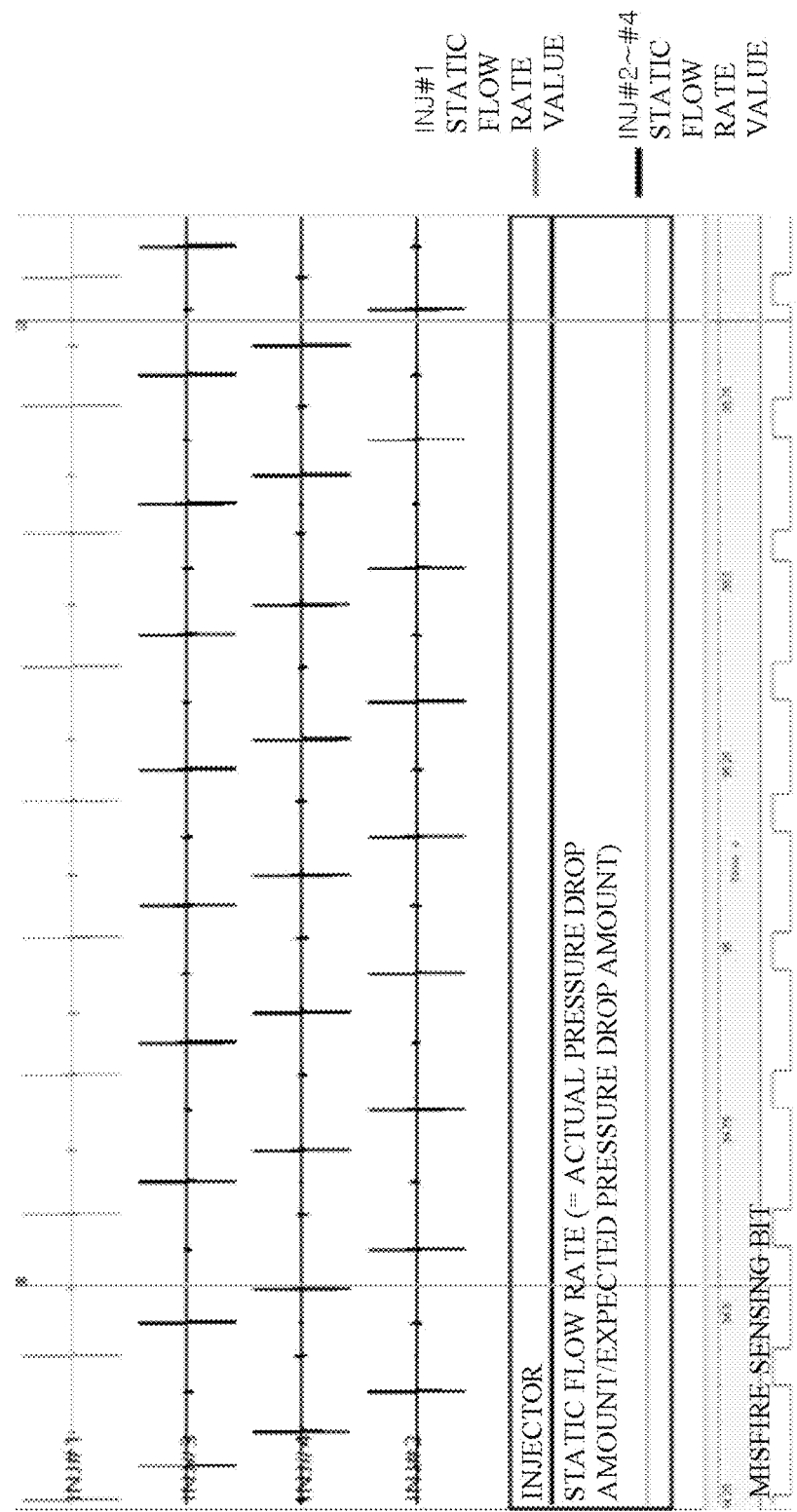
FIG. 7 is a signal diagram illustrating a difference between the static flow rates of the normal injector and the mechanical failure occurring injector.

Therefore, as illustrated in FIG. 7, the pressure drop amounts just before and just after the injector 120 injects the fuel largely deviate from a predetermined range, such that the static flow rate determined therefrom deviates from the normal range.

FIG. 7 is a diagram comparing the static flow rate values in the state where the misfire occurs and the normal state. The static flow rate value, as a ratio of an actual pressure drop amount and an expected pressure drop amount, is most ideal when being 1 and generally maintains the level of 0.8 to 1.2. Here, the actual pressure drop amount is a value obtained by calculating the difference between the fuel pressures measured just before and just after the injection is performed and when the injector 120 is normally operated, there is no large difference with the expected pressure drop amount. However, the first cylinder CYL #1 in which the misfire occurs has the static flow rate value much smaller than those of other cylinders when the first injector INJ #1 injects the fuel. That is, since the injector 120 is not opened, the pressure drop does not occur, and since the pressure drop amount at this time is calculated by the ratio with the expected pressure drop amount, the value smaller than the normal value may be inevitably calculated.

Therefore, every time the injection is performed by the injector 120, the injector normality determining unit 53 compares the pressure drop amount calculated by the pressure drop amount calculating unit 42 with the predetermined normal value, and determines that the mechanical failure occurs in the injector 120 if the calculated pressure drop amount deviates from the normal range.

The closing sensing value is a value measurable every time the injection output command for the injector 120 is output, and the static flow rate may also be calculated in the condition where the stable injection amount is formed, such that the cause of the misfire may be determined by immediately determining whether the mechanical failure occurs in the injector at the time point al which the misfire occurs.

Referring to FIG. 2B, the engine angular velocity calculating unit 11 calculates the angular velocity of the engine at each cylinder from a crank position sensor 5 provided in each cylinder. The general vehicle has the crank position sensor 5 and a camshaft position sensor 6, and performs synchronization in an engine synchronizing unit 12 using the crank angle and cam angle measured by each sensor. The engine angular velocity calculating unit 11 calculates the angular velocity of the engine using the crank angle measured by the crank position sensor 5.

Further, a misfire determining unit 13 calculates the engine roughness of the engine based on the angular velocity of the engine calculated by the engine angular velocity calculating unit 11, and then when the roughness is a predetermined threshold or more, it is determined that the misfire occurs. For example, the engine angular velocity unit 11 may measure a rotating time of a saw tooth mounted on the crank shaft to calculate the time at which an explosion stroke is performed in each cylinder, and calculate the roughness based on the thus calculated explosion stroke time.

Meanwhile, when the misfire determining unit 13 determines that the misfire occurs in a specific cylinder, the control unit 100 confirms whether the mechanical failure occurs in the injector 120 in the corresponding cylinder through the injector normality determining unit 53. If it is determined that the mechanical failure occurs in the injector 120 mounted on the cylinder in which the misfire occurs, the control unit 100 determines that the misfire of the corresponding cylinder occurs due to the mechanical failure of the injector 120. Further, a maintenance code storing unit 61 stores a failure code representing that the mechanical failure occurs in the injector 120, a failure code representing the occurrence of the misfire, and a failure code representing that the corresponding misfire occurs due to the mechanical failure of the injector 120. Further, a display or a sound generating device mounted in the interior of the vehicle warns the driver of the misfire occurrence fact.

In this case, when the driver recognizes the misfire occurrence fact to visit the auto repair shop, an auto mechanic may read the failure code stored in the maintenance code storing unit 61 through an ECU scanner to immediately confirm the state of the injector 120 of the corresponding vehicle, thereby immediately replacing the injector 120 without unnecessarily replacing other components. Therefore, it is possible to decrease the unnecessary increase in the cost or the time consumption due to the incorrect maintenance.

The control unit 100 may be implemented in the form of a computer provided in the vehicle. In this case, the control unit 100 may also be implemented by recording the program for achieving the control function thereof in a computer readable recording medium, and reading and executing the program recorded in the recording medium into a computer system. Further, the computer system described herein refers to a computer system embedded in the vehicle, and includes a hardware such as an OS or a peripheral device. Further, the computer readable recording medium refers to a storage device such as a flexible disk, an optical magnetic disk, a portable medium such as a ROM or a CD-ROM, or a hard disk embedded in the computer system. Further, the computer readable recording medium includes dynamically maintaining the program during a short time like a communication line in the case of transmitting the program through a network, such as Internet, or the communication line such as a telephone line, and also maintaining the program during a predetermined time like a volatile memory inside the computer system, which becomes a server or a client of that case. Further, the program may be one for achieving a part of the aforementioned function, and also one capable of achieving the aforementioned function by a combination with the program previously recorded in the computer system.

Further, some models or all of the control unit 100 in the aforementioned exemplary embodiment may be achieved by an integrated circuit such as a large scale integration (LSI). Each model of the control unit 100 may be processed individually, and also processed by integrating some or all thereof. Further, the method of the integrated circuitization is not limited to the LSI and may be achieved by a dedicated circuit or a general processor. Further, if the technology of the integrated circuitization replacing the LSI emerges by the advancement of the semiconductor technology, the integrated circuit by this technology may be used.

Figure 4B:
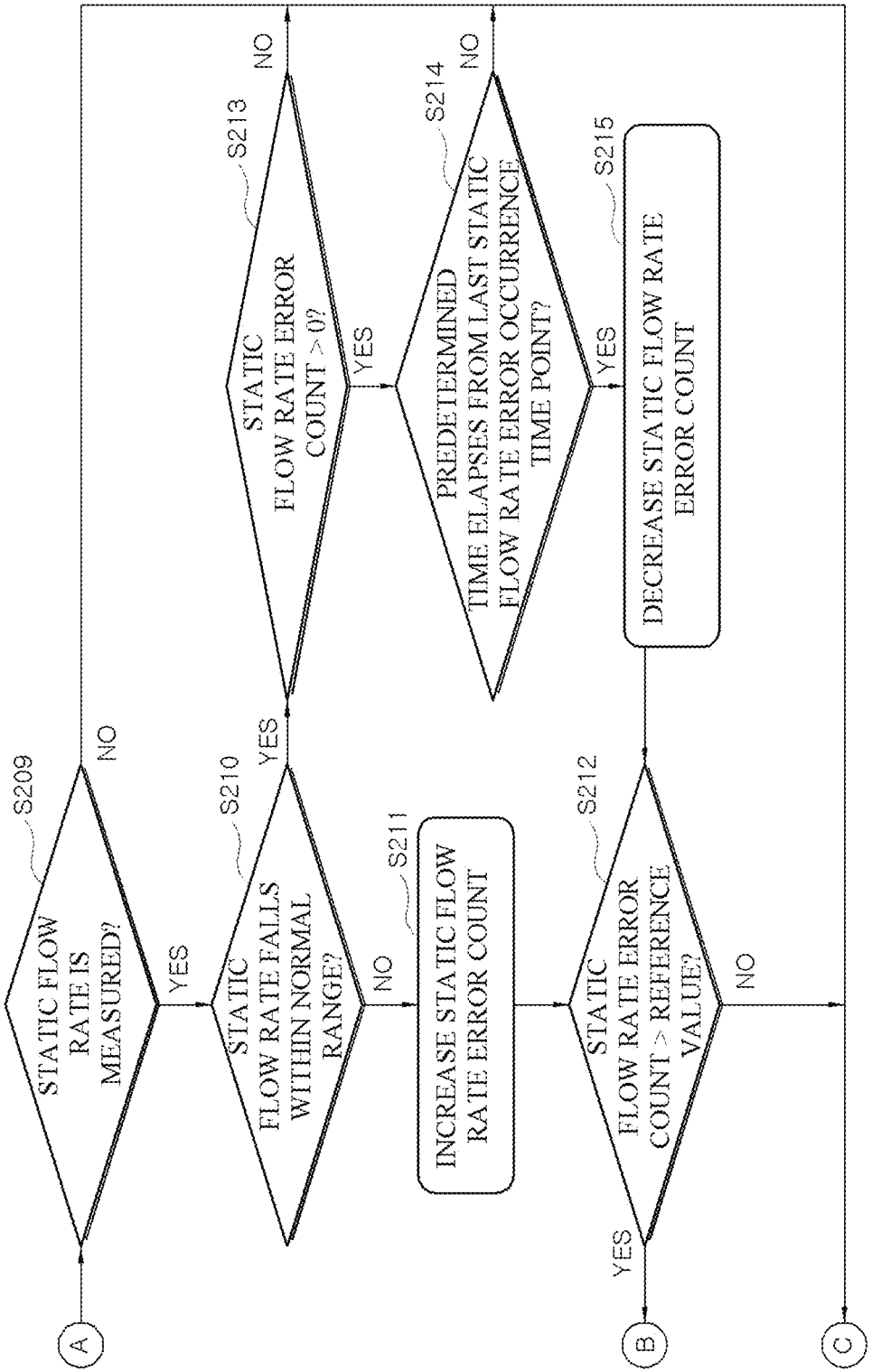

FIGS. 3, 4A and 4B are flowcharts illustrating the method for determining the cause of the misfire according to the exemplary embodiment of the present disclosure, which is performed by the system for determining the cause of the misfire illustrated in FIGS. 2A and 2B.

Referring to FIG. 3, the method for determining the cause of the misfire according to the exemplary embodiment of the present disclosure includes sensing whether the misfire of the engine occurs at S100, determining whether the mechanical failure occurs in the injector of the cylinder in which the misfire occurs if the misfire of the engine is sensed at S200, and storing the failure content of the injector in the maintenance code by determining that the misfire of the engine occurs due to the injector, if it is determined that the mechanical failure occurs in the injector at S300.

As described above, the sensing of whether the misfire occurs (S100) may calculate, by the misfire determining unit 13, the engine roughness based on the angular velocity of the engine calculated by the engine angular velocity calculating unit 11 and then determine that the misfire occurs if the roughness is a predetermined threshold or more.

FIGS. 4A and 4B are a flowchart more specifically illustrating the determining of whether the mechanical failure occurs in the injector (S200) in the method for determining the cause of the misfire illustrated in FIG. 3. FIGS. 3, 4A and 4B illustrate that the determining of whether the mechanical failure occurs in the injector (S200) is executed if it is determined that the misfire occurs in the sensing of whether the misfire of the engine occurs (S100), but the preferred exemplary embodiment of the present disclosure is not limited to the above illustrated content. Preferably, whether the mechanical failure occurs in the injector may be determined every time the injection output command is generated for the injector 120 for each cylinder regardless of whether the misfire occurs.

Referring to FIG. 4A, if the sensing of whether the misfire of the engine occurs (S100) senses that the misfire occurs in a specific cylinder at S201, first, the closing time normality presence/absence determining unit 51 of the control unit 100 determines whether the closing time of the injector 120 falls within the normal range using the aforementioned method at S202.

Further, as the determination result, if it is determined that the closing sensing value (i.e., closing time) of the injector 120 deviates from the normal range, it is determined that the injector 120 is not normally opened, thereby increasing a closing sensing error count related to the corresponding cylinder at S203. Further, the determining of whether the mechanical failure occurs in the injector (S200) determines whether the cumulative closing sensing error count for the corresponding cylinder exceeds a predetermined level at S204, and determines that the mechanical error occurs in the injector 120 when the cumulative closing sensing error count exceeds the predetermined level at S205. It may be difficult to find the inflection point on the output voltage curve even if the injector 120 is normal according to the amount of fuel injected by the injector 120 of the corresponding cylinder, particularly, in a so-called ballistic section in which the fine fuel is injected. In this case, in order not to erroneously determine that the mechanical error occurs, it is determined that the mechanical error occurs in the injector 120 only in the case where the closing sensing error count of the predetermined level or more is accumulated.

Meanwhile, in the step S202, if it is determined that the closing sensing value falls within the normal range, the control unit 100 first determines whether the cumulative error count for the corresponding cylinder exceeds 0 at S206. If the closing sensing count exists by the closing sensing error which has occurred in the past, the control unit 100 determines whether a predetermined time elapses based on the last closing sensing error occurrence time point at S207. Further, if it is determined that the predetermined time elapses based on the last closing sensing error occurrence time point, the control unit 100 decreases the closing sensing error count at S208. As described above, the control unit 100 may determine the error for the normal injector according to the fuel injection section, and there may also be a case where the closing time point sensing has failed by the electrical noise irrelevant to the mechanical error, such that if the error does not occur for a long time, the error count is decreased as a part of a healing logic.

Meanwhile, when it is determined that the closing sensing value falls within the normal range, the control unit 100 determines whether the static flow rate is normal in order to confirm whether the mechanical failure of the injector 120 occurs more reliably.

To this end, the control unit 100 first determines whether the measurement for the static flow rate is performed at S209, as shown in FIG. 4B. Since there is a case where a high pressure pump is operated while the fuel is injected, and there is a case where the injection from the corresponding cylinder overlaps the injection from other cylinders, the static flow rate from the specific cylinder may not be always measured every the injection of the injector 120 like a closing sensing module. Therefore, to determine the mechanical failure of the injector 120 of the specific cylinder based on the static flow rate, the control unit 100 first confirms whether the static flow rate of the cylinder in which the misfire occurs is normally measured (S209).

If it is determined that the static flow rate of the cylinder in which the misfire occurs is normally measured, the control unit 100 determines whether the static flow rate falls within the normal range at S210. As described above, since the static flow rate value is a rate of an actual pressure drop amount measured upon the injection of the injector 120 and the expected pressure drop amount, whether the static flow rate is normal may be determined by whether the measured pressure drop amount falls within the normal range. If the static flow rate value in the corresponding cylinder is an abnormal value, the control unit 100 increases a static flow rate error count relating to the corresponding cylinder at S211. Further, the control unit 100 determines whether a cumulative static flow rate error count for the corresponding cylinder exceeds a predetermined level at S212, and when the cumulative static flow rate error count exceeds the predetermined level, it is determined that the mechanical error occurs in the injector 120 at S205. Like the closing time of the injector 120, in the case of the static flow rate, since the erroneous determination may be temporarily made by the electrical error or other environmental causes, it is determined that the mechanical error occurs only in the case where the error count exceeds a predetermined value.

Meanwhile, in the step S210, if it is determined that the static flow rate value falls within the normal range, the control unit 100 first determines whether the cumulative error count for the corresponding cylinder exceeds 0 at S213. If the closing sensing count exists by the error of the static flow rate value which has occurred in the past, the control unit 100 determines whether a predetermined time elapses based on an error occurrence time point of the last static flow rate value at S214. Further, if it is determined that the predetermined time elapses based on the last error occurrence time point, the control unit 100 decreases a static flow rate error count at S215. Like the closing time of the injector 120, in the case of the static flow rate, the normal injector may be erroneously determined by the electrical error or the environmental cause, such that if the error does not occur for a long time, the error count is decreased as a part of the healing logic.

If it is determined that the mechanical failure occurs in the step S205 for the injector of the cylinder sensed as having the misfire in the step S201, the control unit 100 determines that the misfire of the corresponding cylinder occurs due to the mechanical failure of the injector 120. Further, the control unit 100 allows the maintenance code storing unit 61 to store a failure code representing that the mechanical failure occurs in the injector 120, a failure code representing the occurrence of the misfire, and a failure code representing that the corresponding misfire occurs due to the mechanical failure of the injector 120. Further, the control unit 100 allows a display or a sound generating device mounted in the interior of the vehicle to warn the driver of the misfire occurrence fact.

The method for determining the cause of the misfire according to the present disclosure may determine whether the mechanical failure of the injector occurs when the misfire occurs, and interlock the failure code according to the determination result with the misfire occurrence failure code, thereby accurately determining the cause of the occurrence of the misfire due to the mechanical failure of the injector. Therefore, it is possible to decrease the possibility of the erroneous maintenance, thereby significantly decreasing the maintenance time and the maintenance cost.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A method for determining the cause of misfire of an engine, the method comprising:
    sensing with a control unit whether a misfire of an engine occurs;
    determining whether a mechanical failure occurs in an injector of a cylinder in which the misfire occurs, if the misfire of the engine is sensed; and
    storing a failure content of the injector in a maintenance code by determining that the misfire of the engine occurs due to the injector, if it is determined that the mechanical failure occurs in the injector;
    wherein the determining whether the mechanical failure occurs in the injector of the cylinder in which the misfire occurs determines whether the mechanical failure occurs in the injector by determining whether a closing sensing value of the injector falls within a normal range.

2. The method of claim 1, wherein if the closing sensing value of the injector does not fall within the normal range, a closing sensing error count is increased, and
    wherein if the closing sensing error count exceeds a predetermined value, it is determined that the mechanical failure occurs in the injector.

3. The method of claim 2, wherein if the closing sensing error count is larger than 0, the closing sensing error count is decreased when a predetermined time or more elapse from the last closing sensing error occurrence time point.

4. The method of claim 1, wherein if it is determined that the closing sensing value of the injector falls within the normal range, it is determined whether the mechanical failure occurs in the injector by determining whether a measured value of a static flow rate falls within a normal range.

5. The method of claim 4, wherein if the measured value of the static flow rate does not fall within the normal range, the static flow rate error count is increased, and
    wherein if the static flow rate error count exceeds a predetermined value, it is determined that the mechanical failure occurs in the injector.

6. The method of claim 4, wherein if the static flow rate error count is larger than 0, the static flow rate error count is decreased when a predetermined time or more elapse from the last static flow rate error occurrence time point.

7. The method of claim 1, wherein it is determined whether the mechanical failure occurs in the injector of the cylinder in which the misfire occurs every time the fuel is injected to each cylinder of the engine by the injector.

* * * * *